United States Patent [19]

Irikura et al.

[11] Patent Number: 4,539,623
[45] Date of Patent: Sep. 3, 1985

[54] SOLID ELECTROLYTIC CHIP CAPACITOR WITH IMPROVED TERMINALS

[75] Inventors: Tsutomu Irikura, Joyo; Nobuo Hasegawa, Uji, both of Japan

[73] Assignee: Matsushita Electric Industrial Company, Limited, Osaka, Japan

[21] Appl. No.: 684,990

[22] Filed: Dec. 24, 1984

Related U.S. Application Data

[63] Continuation of Ser. No. 249,560, Mar. 31, 1981, abandoned.

[30] Foreign Application Priority Data

Apr. 2, 1980 [JP] Japan .................................. 55-43965

[51] Int. Cl.$^3$ .............................................. H01G 9/00
[52] U.S. Cl. ....................................... 361/433; 29/570
[58] Field of Search .......................... 361/433; 29/570; 357/70, 72

[56] References Cited

U.S. PATENT DOCUMENTS

| | | | |
|---|---|---|---|
| 4,068,291 | 1/1978 | Pierpont | 361/433 |
| 4,089,041 | 5/1978 | Lockard | 357/70 X |
| 4,247,883 | 1/1981 | Thompson et al. | 361/433 |
| 4,288,842 | 9/1981 | Voyles | 361/433 |

FOREIGN PATENT DOCUMENTS 531045 of 0000 Japan .

Primary Examiner—L. T. Hix
Assistant Examiner—Douglas S. Lee
Attorney, Agent, or Firm—Pollock, VandeSande & Priddy

[57] ABSTRACT

In a solid electrolytic chip capacitor having a capacitor element of the type manufactured by laminating a metal oxide semiconductor layer and a cathode layer one after another on an anode electrode made of a sinter of a valve metal, which anode electrode has an anode lead made of a valve metal, and has a dielectric oxide film on the surface thereof, an anode terminal is connected to an upper portion of the anode lead, while a cathode terminal is connected to an upper portion of the cathode layer. The capacitor element as well as a portion of the anode terminal and a portion of the cathode terminal are embedded in a resin casting, and the anode and cathode terminals are respectively drawn from both sides of the casting, and bent so that exposed portions of the anode and cathode terminals are situated along the sides and the lower surface of the casting. The cathode terminal has a U-shaped portion for receiving the capacitor element, while elongate slots may be made in both terminals. A window may be made in the anode terminal so as to ensure welding with respect to the anode lead.

4 Claims, 20 Drawing Figures

FIG. 1A
PRIOR ART
FIG. 1B
PRIOR ART
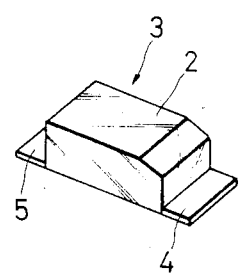
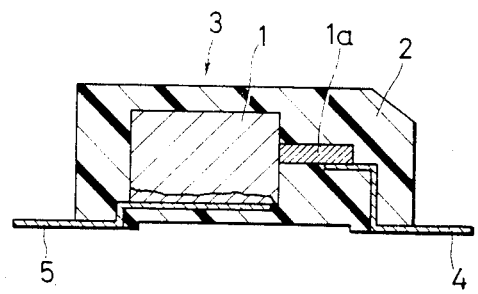
FIG. 2A
PRIOR ART
FIG. 2B
PRIOR ART
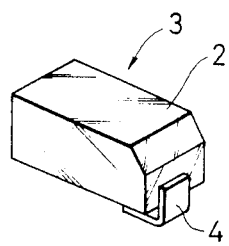
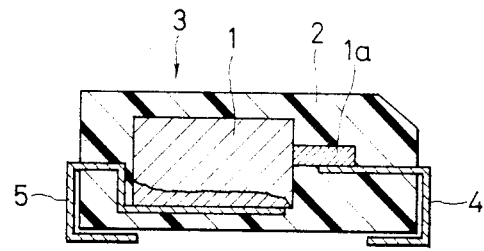

SOLID ELECTROLYTIC CHIP CAPACITOR WITH IMPROVED TERMINALS

This application is a continuation of application Ser. No. 249,560, filed Mar. 31, 1981, now abandoned.

BACKGROUND OF THE INVENTION

This invention generally relates to a solid electrolytic capacitor and a method for manufacturing the same, which capacitor is of face bonding type, and is fixed in a casting of an insulating synthetic resin.

Conventional solid electrolytic capacitors of this sort have been constructed such that a capacitor element is manufactured by laminating a metal oxide semiconductor layer, such as a manganese dioxide film, and a cathode layer made of carbon and silver paint one after another on an anode electrode made of a sinter of a valve metal, such as tantalum, which anode electrode has an anode lead made of a valve metal, such as tantalum, and a dielectric oxide film formed on the surface thereof, and then the capacitor element is wrapped by an insulating synthetic resin so as to form a capacitor body. From the capacitor body are led an anode terminal connected to the anode lead, and a cathode terminal connected to the cathode layer.

As will be described with reference to the accompanying drawings hereinafter, conventional solid electrolytic chip capacitors have suffered from various problems. For instance, some conventional chip capacitors are large in size, while some other chip capacitors are difficult to manufacture although the size thereof is relatively small. Furthermore, conventional solid electrolytic capacitors of this sort have had variations in quality throughout a number of products.

SUMMARY OF THE INVENTION

This invention has been developed in order to remove the above-mentioned disadvantages and drawbacks inherent to the conventional solid electrolytic chip capacitors.

It is, therefore, an object of the present invention to provide a solid electrolytic chip capacitors and the method for manufacturing the same, which capacitor is small in size, and the chip capacitors can be readily mass produced, while the quality thereof is maintained high.

According to a feature of the present invention, chip capacitors can be readily mounted on a printed circuit board within a short period of time because a dip soldering technique can be adopted.

In accordance with the present invention there is provided a solid electrolytic capacitor comprising: (a) a capacitor element having an anode member with a dielectric oxide film on the surface thereof, an electrolytic layer and a cathode layer both laminated on said anode member one after another, and an anode lead connected to said anode member and projecting outwardly from the body of said capacitor element; (b) a casting made of an insulating synthetic resin for supporting and surrounding said capacitor element, said casting having first and second sides which face each other, and upper and lower surfaces; (c) an anode terminal electrically connected, at its one end, to said anode lead at the upper portion of said anode lead, said anode terminal being drawn from said casting via said first side, and bent so that said anode terminal is situated along said first side and said lower surface of said casting; and (d) a cathode terminal having a U-shaped portion at its one end for receiving said capacitor element therein so that said cathode layer is electrically connected to said cathode terminal, said cathode terminal being drawn from said casting via said second side, and bent so that said cathode terminal is situated along said second side and said lower surface of said casting.

In accordance with the present invention there is also provided a method for manufacturing a solid electrolytic chip capacitor having a capacitor element, which has an anode member with a dielectric oxide film on the surface thereof, an electrolytic layer and a cathode layer both laminated on said anode member one after another, and an anode lead connected to said anode member and projecting outwardly from the body of said capacitor element, said method comprising the steps of:

(a) placing said capacitor element on a lead frame having a plurality of anode terminal pieces and a plurality of cathode terminal pieces, each of said anode terminal pieces having a connecting portion at its tip portion, and each of said cathode terminal pieces having a U-shaped connecting portion at its tip portion, said connecting portion of each of said anode terminal pieces facing said connecting portion of each of said cathode terminal pieces, said capacitor element being placed in such a manner that the upper side of said anode lead is in contact with said connecting portion of one of said anode terminal pieces, and the upper side of said cathode layer is received in said U-shaped connecting portion of one of said cathode terminal pieces which one faces said anode terminal piece;

(b) connecting said anode lead to said connecting portion of said anode terminal piece, and connecting said cathode layer to said connecting portion of said cathode terminal piece;

(c) casting an insulating synthetic resin so as to support and surround said capacitor element as well as a portion of said anode terminal piece and a portion of said cathode terminal piece, so that a resin casting constituting a capacitor body having first and second sides facing each other and upper and lower surfaces, is formed;

(d) cutting off said anode terminal piece and said cathode terminal piece at give positions from said lead frame; and (e) bending said anode terminal piece and said cathode terminal piece so that these pieces are respectively situated along said first and second sides and said lower surface of said capacitor body.

BRIEF DESCRIPTION OF THE DRAWINGS

The object and features of the present invention will become more readily apparent from the following detailed description of the preferred embodiments taken in conjunction with the accompanying drawings in which:

Fig. 1A is a perspective view of a conventional solid electrolytic chip capacitor;

Fig. 1B is a cross sectional view of the capacitor chip of Fig. 1A;

FIG. 2A is a perspective view of another conventional solid electrolytic chip capacitor;

FIG. 2B is a cross sectional view of the chip capacitor of FIG. 2B;

DETAILED DESCRIPTION

Figure 3:
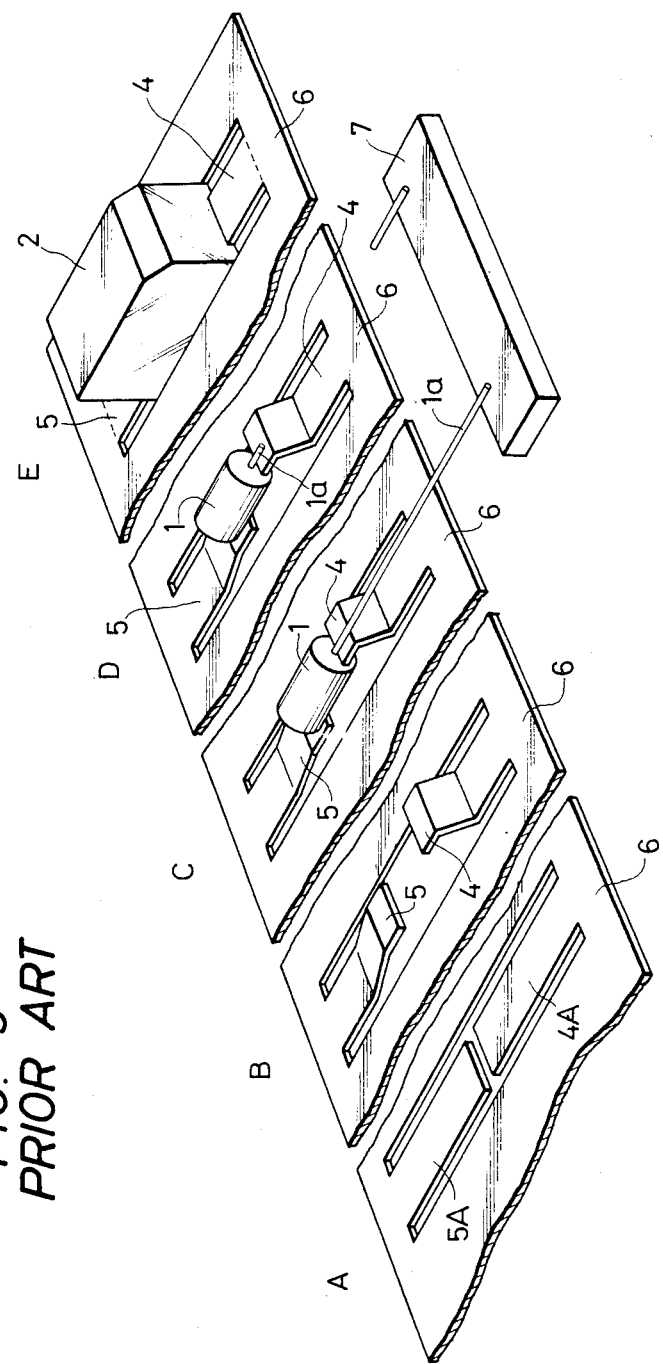
FIG. 3 is an explanatory view showing the manufacturing process of the chip capacitor of Figs. 1A and 1B.

Prior to describing the embodiments of the present invention, some conventional solid electrolytic chips capacitors will be described for a better understanding of the object and features of the present invention.

Figs. 1A and 1B show a typical conventional solid electrolytic chip capacitors, while FIGS. 2A and 2B show another typical conventional chip capacitor. The capacitor chip 3 of Figs. 1A and 1B comprises a capacitor element 1 having an anode lead 1a, an anode terminal 4 connected to the anode lead 1a, a cathode terminal 5 connected to a cathode layer, which is positioned at the outmost position of the capacitor element 1, and a casting 2, made of a synthetic resin, for fixedly supporting and surrounding the capacitor element 1. The anode terminal 4 is made of a solderable material, and is welded to the anode lead 1a, while the cathode terminal 5 is also made of a solderable material, and is soldered to the outmost portion of the capacitor element 1. The anode and cathode terminals 4 and 5 are drawn outwardly from the casting 2, i.e. a capacitor body, in such a manner that exposed portions of the terminals 4 and 5 are positioned below the lower surface of the capacitor element 1.

FIGS. 2A and 2B also show another typical solid electrolytic chip capacitor, and the chip capacitor of FIGS. 2A and 2B differs from that of Figs. 1A and 1B in that the anode and cathode terminals 4 and 5 are respectively drawn via both sides, which face each other, of the chip capacitor 3, and are respectively bent so that portions of the terminals 4 and 5 are positioned along the lower surface of the chip capacitor 3.

The above-mentioned conventional solid electrolytic chip capacitors have been manufactured hitherto in a process shown in FIG. 3. FIG. 3 shows a manufacturing process of the chip capacitor shown in Figs. 1A and 1B, and in FIG. 3, five steps A to E in the manufacturing process are shown. First, as shown in the first step A, a lead frame 6 is die-cut to form two pieces 4a and 5a, and then these pieces 4a and 5a are bent to respectively assume given forms in a second step B so as to become the anode and cathode terminals 4 and 5. Then a capacitor element 1 is placed on the anode and cathode terminals 4 and 5 in the third step C, and then the anode lead 1a is connected to the anode terminal 4, while the cathode layer at the out-most portion of the capacitor element 1 is connected to the cathode terminal 5 in the fourth step D. Meanwhile, the anode lead 1a is cut in the vicinity of the capacitor element 1. Finally, the capacitor element 1, a portion of the cathode terminals and a portion of the anode terminal 4 are embedded in a casting made of a synthetic resin 2 in the fifth step E. Then the anode and cathode terminals 4 and 5 are respectively cut off at positions indicated by dotted lines from the lead frame 6. In the above-described manufacturing process, a holding plate 7 is employed for supporting the anode lead 1a. Namely, the anode lead 1a has been welded, at the end thereof, to the holding plate 7 in advance so that the capacitor element 1 is securely placed on the lead frame 6.

The above-described conventional solid electrolytic chip capacitor of Figs. 1A and 1B has a drawback that the entire size thereof is large since each of the anode and cathode terminals 4 and 5 outwardly extends from the capacitor body 3, and another drawback that only one soldering technique, i.e. so-called reflow soldering, can be applied when mounting the chip capacitor on a printed circuit board, in which reflow soldering, solder attached to the printed circuit board in advance is melted by applying heat so as to solder the anode and cathode terminals 4 and 5 to the printed circuit board.

On the other hand, in the chip capacitor having the structure shown in FIGS. 2A and 2B, the entire size of the chip capacitor is smaller than that of Figs. 1A and 1B since the anode and cathode terminals 4 and 5 are both bent inward along the lower surface of the capacitor body 3. However, the exposed areas of the anode and cathode terminals 4 and 5 on both sides of the capacitor body 3 are relatively small, while the widths of the anode and cathode terminals 4 and 5 are considerably narrower than the width of the capacitor body 3. Accordingly, the chip capacitor of FIGS. 2A and 2B could be mounted on a printed circuit board by only the above-mentioned reflow soldering technique.

Furthermore, as is apparent from FIG. 3, in the prior art, since the decision of the position of the capacitor element 1 with respect to the anode and cathode terminals 4 and 5 has not been effected, the connecting positions between the capacitor element 1 and the anode and cathode terminals 4 and 5 have had variations throughout a number of products, resulting in variations in the quality of the products.

The present invention, therefore, provides an improved solid electrolytic chip capacitor and a method for manufacturing the same, so that dip soldering technique, with which a number of parts can be soldered to a printed circuit board, may be adopted, while the size of a chip capacitor is small, and quality thereof is superior.

Figure 4:
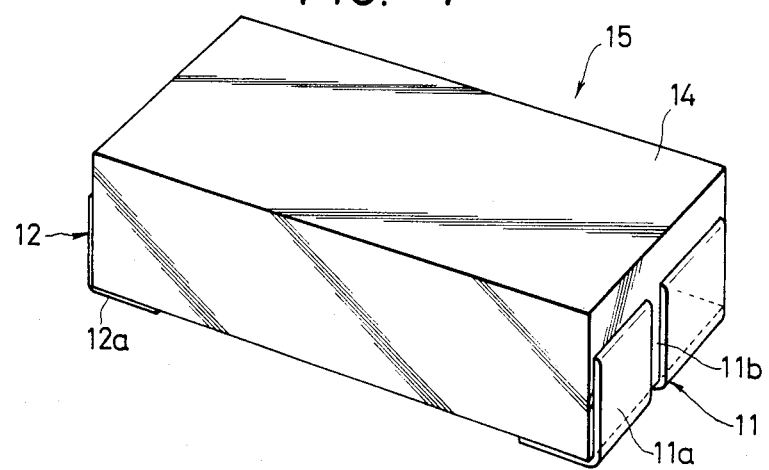
FIG. 4 is a schematic perspective view of an embodiment of a solid electrolytic chip capacitor according to the present invention.
Figure 5A:
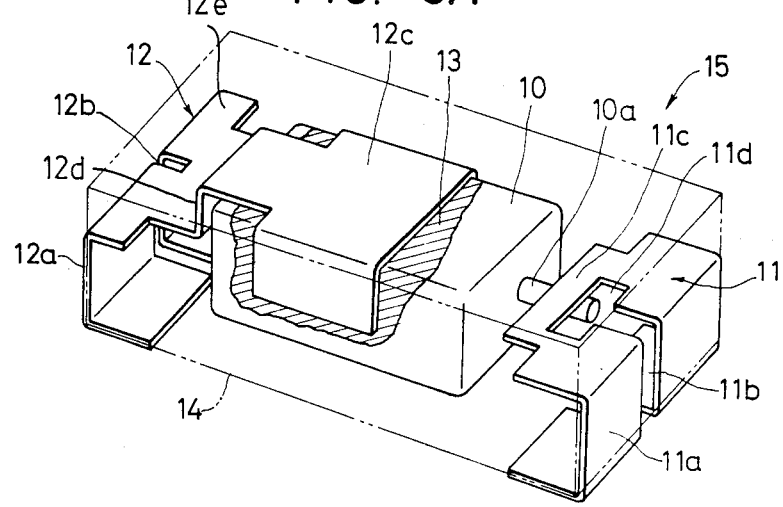
FIG. 5A is a schematic perspective view of the chip capacitor shown in FIG. 4, for showing the inner structure thereof.
Figure 5B:
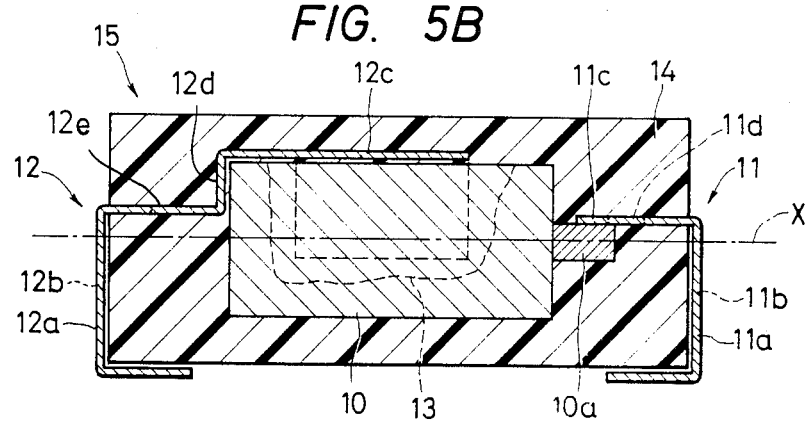
FIG. 5B is a cross-sectional view of the chip capacitor of FIGS. 4 and 5A.

Hence, reference is now made to FIG. 4 which shows a perspective view of a solid electrolytic chip capacitor according to the present invention, and to Figs. 5A and 5B which show the inner structure of the chip capacitor of FIG. 4 by way of a perspective view and a cross-sectional view.

In FIGS. 5A and 5B, the reference numeral 10 is a capacitor element which has substantially the same structure as the conventional one. Namely, the capacitor element 10 is formed by laminating an electrolytic layer made of a metal oxide semiconductor, such as a manganese dioxide, an organic semiconductor or the like, and a cathode layer made of carbon and silver paiht one after another on an anode electrode made of a sinter of a valve metal, such as tantalum. The anode electrode has an anode lead 10a made of a valve metal, such as tantalumn, and a dielectric oxide film formed on the surface of the anode electrode.

The reference 11 is an anode terminal welded to the anode lead 10a of the capacitor element 10; 12, a cathode terminal connected via a conductive member 13, such as solder or conductive paint, to the cathode layer of the capacitor element 10; and 14, a casting made of an insulating synthetic resin, in which the capacitor element 10 as well as a portion of the anode terminal 11 and a portion of the cathode terminal 12 are supported and embedded. The casting including these elements therein will be referred to as a capacitor body hereafter. The capacitor body 15 has right and left sides, which face each other, and upper and lower surfaces. The above-mentioned anode and cathode terminals 11 and 12 are respectively drawn from the capacitor body 15 via the right and left sides, and are bent respectively at a right angle downward along the right and left sides, and are further bent inward at a right angle along the lower surface of the capacitor body 15. Namely, each of the anode terminal 11 and the cathode terminal 12 comprises an exposed portion which is L-shaped, and the L-shaped portions of the anode and cathode terminals 11 and 12 function as external connecting portions 11a and 12a. The width of each of the external connecting portions 11a and 12a substantially equals the width of the capacitor body 15. Elongate slots 11b and 12b are respectively made at the center portions of the anode and cathode terminals 11 and 12. Each of the slots 11b and 12b extends from one end, which is located on the lower surface of the capacitor body 15, of each of the terminals 11 and 12 to a portion embedded in the casting of the insulating synthetic resin 14. With this arrangement, the combination of the anode and cathode terminals 11 and 12 has a four-terminal structure.

In the anode terminal 11, the slot 11b communicates with a wide portion 11d, which is referred to as a window, positioned in the vicinity of a connecting portion 11c at which the anode lead 10a is connected. The connecting portion 11c is referred to as a flat portion hereinafter. In detail, the window 11d is provided at a given position spaced by a given distance from the tip of the anode terminal 11. The width of the window 11d is greater than that of the elongate slot 11b, and preferably, greater than the diameter of the anode lead 10a. The connecting portion 11c is placed on the anode lead 10a in such a manner that the connecting portion 11c is at the top of the anode lead 10a.

On the other hand, a portion embedded in the casting of the insulating synthetic resin 14, of the cathode terminal 12 is bent to form a crank-like shape, and the tip portion of the cathode terminal 12 ahead of the crank-shaped portion 12d has a U-shaped connecting portion 12c so that the cathode layer of the capacitor element 10 is received in or engaged with the U-shaped portion.

In detail, the cathode terminal 12 comprises a flat portion 12e connected to the U-shaped portion by the crank-shaped portion 12d. The crank-shaped portion 12d is referred to as a neck portion since the width of the crank-shaped portion 12 is smaller than a largest width of the flat portion 12e.

Since the capacitor chip is constructed in the above-described manner, each of the anode and cathode terminals 11 and 12 can be drawn from the capacitor body 15, when viewed from the front side as shown in the cross-sectional view of FIG. 5B, at a point which is above a center line X bisecting the height of the capacitor body 15. As a result, the exposed area of each of the anode and cathode terminals 11 and 12 is made much larger than that of the conventional capacitors of the same sort. Assuming that the capacitor element 10 is positioned at the center in the direction of the height of the capacitor body 15, each of the anode and cathode terminals 11 and 12 can be drawn outside at a point which is above the center line x by one-half the diameter of the anode lead 10a. Accordingly, the thicker the diameter of the anode lead 10a, the higher the drawing point of each of the anode and cathode terminals 11 and 12, and therefore, it is preferable that the diameter of the anode lead 10a is as great as possible. In the above, although it has been supposed that the capacitor element 10 was at the middle in the direction of the height of the capacitor body 15, the position of the capacitor element 10 may be changed a little so that the capacitor element 10 is at a higher position than shown, providing a larger exposed area for the external connecting portions 11a, 11b, 12a and 12b of the anode and cathode terminals 11 and 12.

As shown in FIGS. 5A and 5B, the abovementioned flat portions 11c and 12d of the anode and cathode terminals 11 and 12 are flush with each other to be positioned within a single plane, which is located above the center line X when viewed from the side of the chip capaictor body 15. Since the flat portion 11c of the anode terminal 11 and the U-shaped portion 12c, the neck portion 12d and the flat portion 12e are all embedded in the casting 14, the anode and cathode terminals 11 and 12 are respectively drawn from the body 15 of the capacitor at the same level or height measured from the bottom of the body 15.

Figure 6:
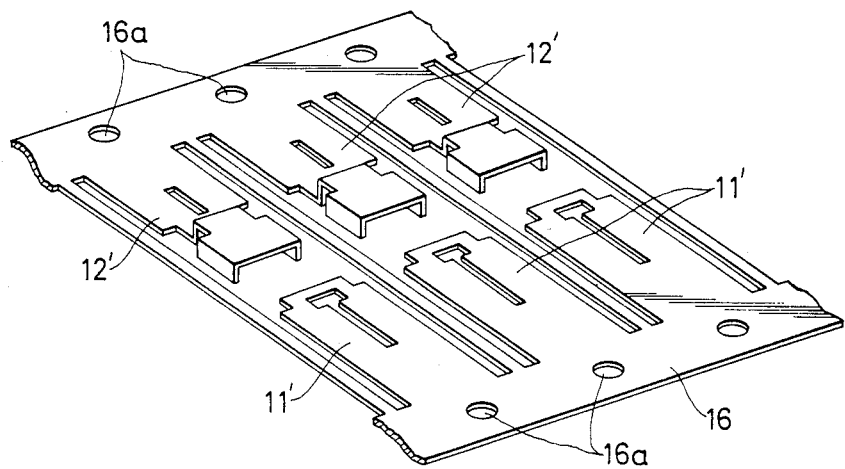
FIGS. 6 to 10 are explanatory views for showing the manufacturing process of the chip capacitor shown in FIGS. 4, 5A and 5B.

Now the manufacturing process of the solid electrolytic chip capacitor of FIGS. 4, 5A and 5B will be described with reference to FIGS. 6 to 10. FIG. 6 is a perspective view of a portion of a lead frame used for manufacturing the capacitor chips. A solderable metal sheet is die-cut to constitute the lead frame 16, in such a manner that anode terminal pieces 11', which will be the anode terminals 11 of a plurality of chip capacitors, and cathode terminal pieces 12', which will be the cathode terminals 12 of the same, are respectively formed. Given portions in the cathode terminal pieces 12' are bent so that the above-mentioned crank-shaped portions and the U-shaped portions are formed. The tip portion of each of the anode terminal pieces 11' and the tip portion of each of the cathode terminal pieces 12' are arranged to face each other, having a given space therebetween. Holes 16a are made at both sides of the lead frame 16 so as to be used for feeding the lead frame 16 during manufacturing.

Figure 7:
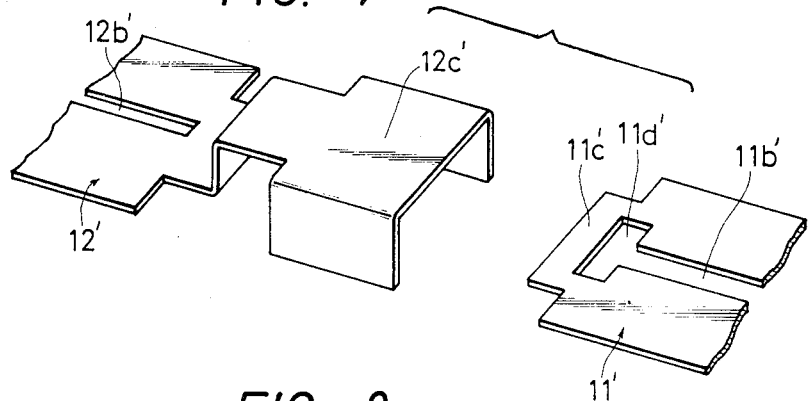
Figure 8:
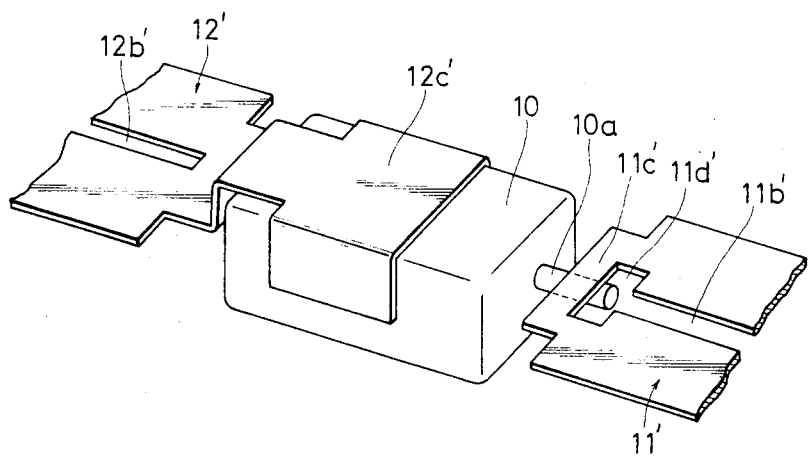

FIG. 7 is an enlarged view of FIG. 6, and at the first step in the manufacturing process, the capacitor element 10 is positioned between the crank-shaped portion of the cathode terminal piece 12' and the tip portion of the anode terminal piece 11' in such a manner that the capacitor element 10 is received in the U-shaped portion 12c' of the cathode terminal piece 12'. Namely, the capacitor element 10 is located below the U-shaped portion 12c' of the cathode terminal piece 12', while the anode lead 10a is located below the connecting portion 11c of the anode terminal piece 11' as shown in FIG. 8. Since the capacitor element 10 is received in the U-shaped portion 12c', the position of the capacitor element 10 is readily decided and fixed.

Figure 9:
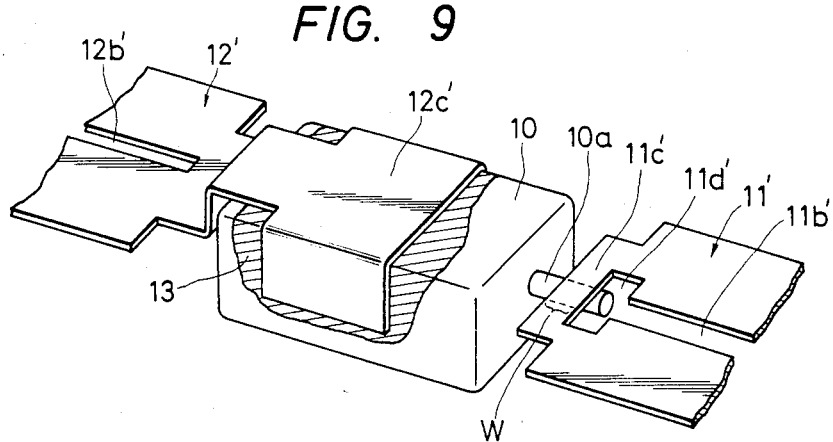

Then, the anode lead 10a is welded to the connecting portion 11c' of the anode terminal piece 11', while the cathode layer of the capacitor 10 is connected via a conductive material 13 to the connecting portion 12c' of the cathode terminal piece 12' as shown in FIG. 9. In FIG. 9 the reference W is a welded portion for the connecting portion 11c of the anode terminal 11.

With the provision of the above-mentioned window 11d', electric current on resistance welding easily concentrates on a small given area, and thus welding between the connecting portion 11c' and the anode lead 10a is securely effected. In addition, with the provision of the window 11d', the anode lead 10a may be readily cut by applying cutter blades (not shown) from upper and lower sides of the anode lead 10a.

Figure 10:
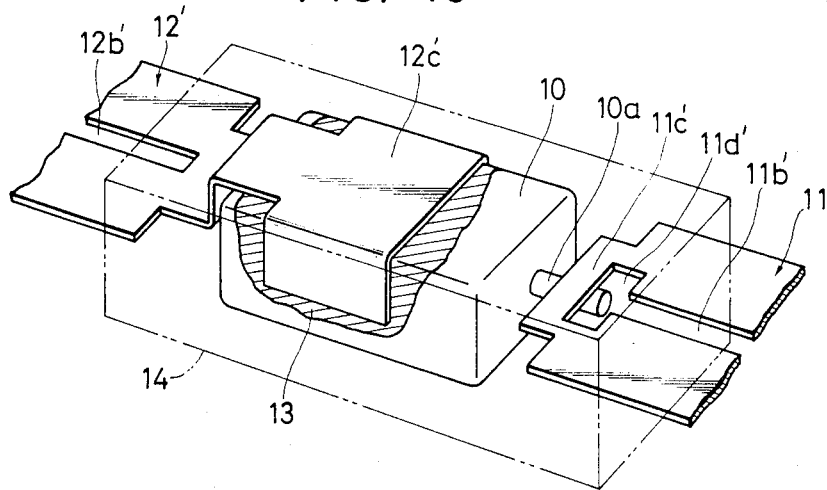

After the capacitor element 10 is fixed to the anode and the cathode terminal pieces 11' and 12' in this way, the insulating synthetic resin 14 is casted so as to fix and surround the capacitor element 10 as well as a portion of the anode terminal piece 11' and a portion of the cathode terminal piece 12', as indicated by a dotted line in FIG. 10. After this casting process, each of the anode and cathode terminal pieces 11' and 12' is cut at a given position in such a manner that the elongate slots 11b' and 12b' respectively have open ends. Then each of the anode and cathode terminal pieces 11' and 12' are bent at a right angle at two positions so that each of them is situated along the side and the lower surface of the capacitor body 15 as shown in FIGS. 4, 5A and 5B, completing a solid electrolytic capacitor chip.

In the above, it has been described that the U-shaped cathode terminal piece 12' is connected via the conductive material 13 to the cathode layer of the capacitor 10, and in detail, the conductive material 13 may be a conductive adhesive. As another preferable method for effecting connection between the cathode layer and the cathode terminal 12', the cathode layer of the capacitor element 10 may be coated with solder in advance, and after engagement with the U-shaped cathode terminal piece 12', the connecting portion 12c' thereof may be heated so that reflow soldering is effected, namely, the solder is molten with the application of heat and will freeze to fixedly connect the cathode terminal to the U-shaped connecting portion 12c' of the cathode terminal piece 12'.

Figure 11:
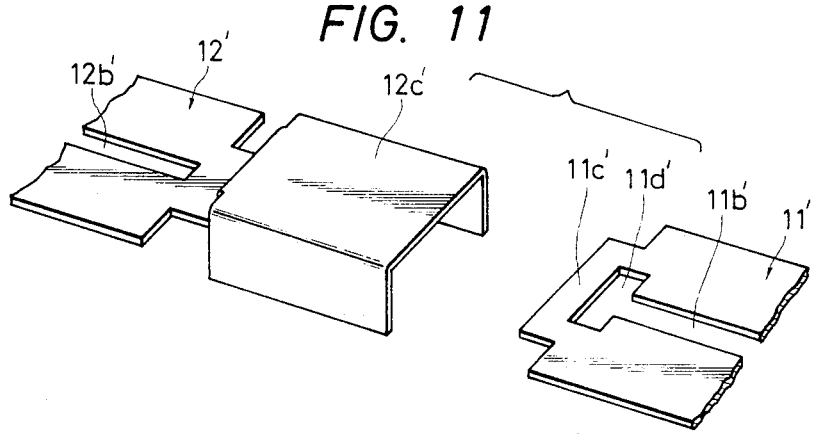
FIGS. 11 to 13 are schematic perspective views showing an anode terminal piece and a cathode terminal piece of a lead frame used in the manufacturing process of the chip capacitor according to the present invention.
Figure 12:
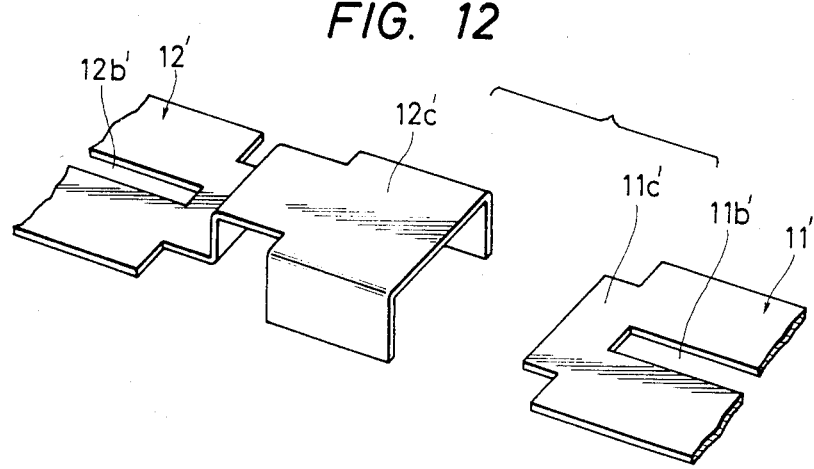
Figure 13:
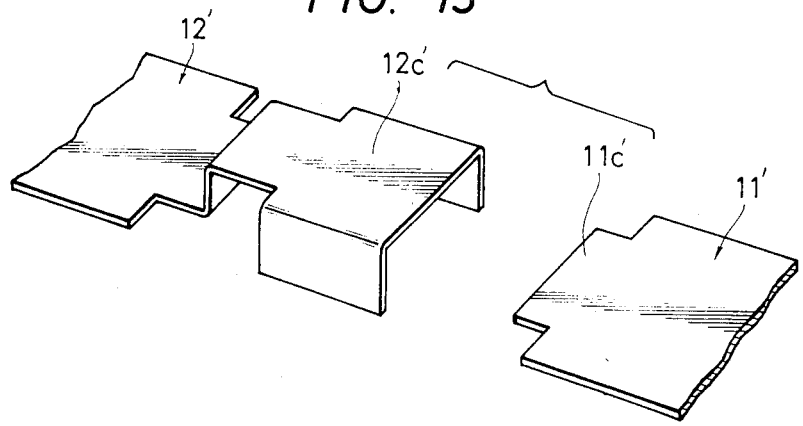
Figure 14:
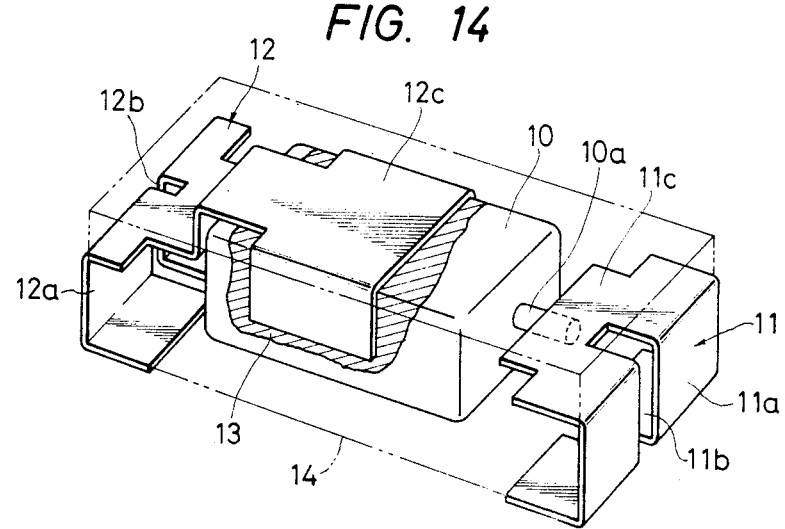
FIG. 14 is a schematic perspective view of another embodiment of the solid electrolytic chip capacitor according to the present invention, showing the inner structure of the chip capacitor which comprises terminal pieces shown in FIG. 12.
Figure 15:
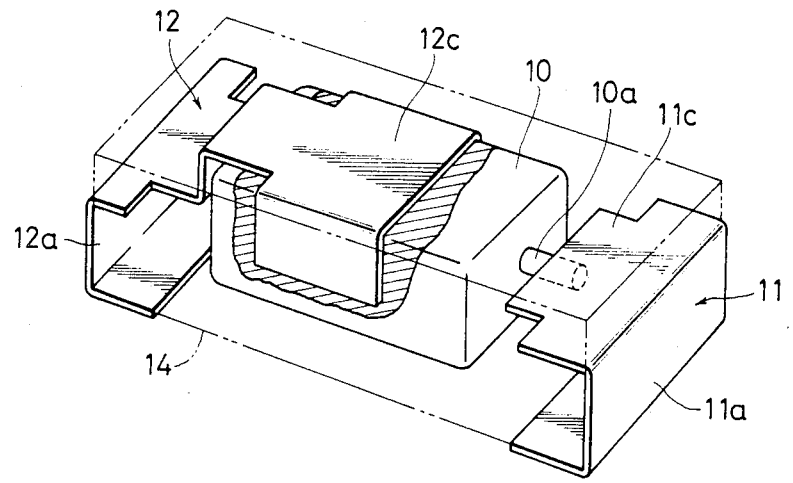
FIG. 15 is a schematic perspective view of a further embodiment of the solid electrolytic chip capacitor according to the present invention, showing the inner structure of the chip capacitor which comprises terminal pieces shown in FIG. 13.

From the above it will be understood that solid electrolytic capacitors may be mass produced by using the manufacturing method according to the present invention. The shapes of the anode terminal piece 11' and the cathode terminal piece 12' are not limited to those described in the above embodiment. Namely, the U-shaped connecting portion 12c' of the cathode terminal piece 12' may be lengthened in its longitudinal direction as shown in FIG. 11 so that the area of the connecting portion 12c' can be increased, while a narrow-width portion in the bend of the crank-shaped portion may be reduced. Moreover, as shown in FIG. 12, the above-mentioned window 11d' (see FIG. 7) may be omitted from the connecting portion 11c' of the tip of the anode terminal piece 11'. Furthermore, as shown in FIG. 13, the window 11d' as well as the slots 11b' and 12b' in the anode and cathode terminal pieces 11' and 12' may be omitted if desired. Namely, various modifications in connection with the shapes of the anode and cathode terminals 11 and 12 may be made. FIGS. 14 and 15 are respectively explanatory perspective views of other embodiments of the solid electrolytic chip capacitors according to the present invention, where these embodiments respectively comprise the above-mentioned modified anode and cathode terminal pieces 11' and 12' respectively shown in FIGS. 12 and 13.

The solid electrolytic chip capacitors according to the present invention may be soldered and mounted on a printed circuit board by means of dip soldering. Generally speaking, in accordance with dip soldering technique a capacitor body is provisionally placed on a given position of a printed circuit board by means of an adhesive, and then the printed circuit board is turned upside down and is dipped into a soldering bath containing molten solder of 200 to 270 degrees centigrade.

Figure 16:
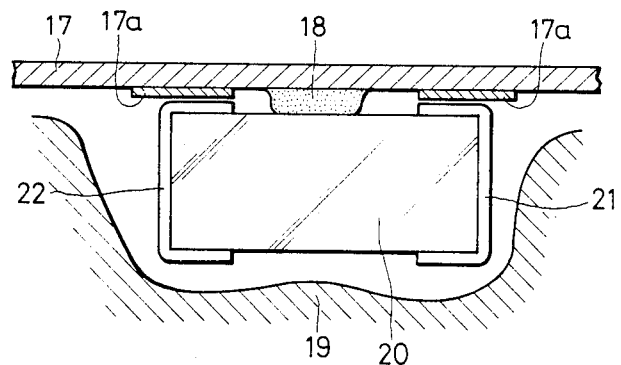
FIG. 16 is an explanatory cross-sectional view showing a generally practiced dip soldering technique.

FIG. 16 shows a conventional dip soldering technique with which a capacitor body is mounted on a printed circuit board. In FIG. 16, the reference 17 is a printed circuit board; 17a, a conductor pattern on the printed circuit board 17; 18, an adhesive; 19, molten solder; 20, a capacitor body; 21, a U-shaped anode terminal of the capacitor; and 22, a U-shaped cathode terminal of the capacitor. By dipping the printed circuit board 17 into molten solder 19, the anode and cathode terminals 21 and 22 are soldered to given positions of the conductor pattern 17a of the printed circuit board 17.

In order to satisfactorily perform soldering by such dip soldering technique, it is necessary that the exposed area of each terminal of the chip capacitor is sufficiently large so that the terminal comes into contact with the molten solder well. Therefore, if the conventional chip capacitors of FIGS. 1A and 1B, and FIGS. 2A and 2B were soldered by dip soldering, satisfactory contact between the terminals and the molten solder would not result because the exposed area of each of the terminals is too small. Namely, dip soldering technique cannot be adapted to such conventional chip capacitors. For this reason, when it is intended to adopt dip soldering technique, U-shaped anode and cathode terminals 21 and 22 are used as illustrated in FIG. 16 in the prior art. However, such a conventional technique of using U-shaped terminals of FIG. 16 have suffered from various drawbacks. Namely, when manufacturing very small chip capacitors, for instance, the entire length thereof is of several millimeters; it is very troublesome and difficult, in practice, to form such U-shaped terminals having neat shape. In addition, when such U-shaped terminals are used, mass production is difficult because a lead frame cannot be used.

Figure 17:
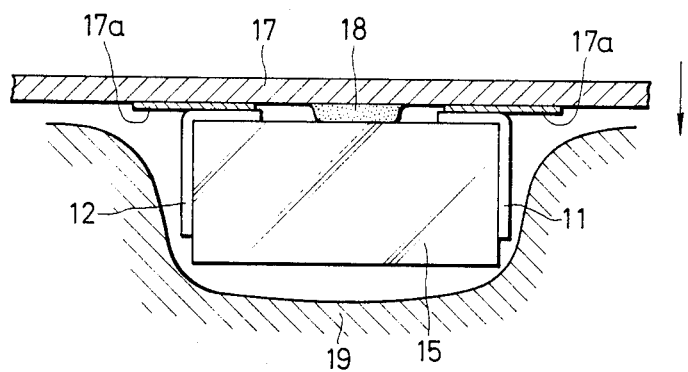
FIG. 17 is an explanatory cross-sectional view showing a dip soldering technique which can be adopted for fixing the chip capacitor according to the present invention on a printed circuit board.

The present invention has resolved these conventional problems at once. In accordance with the present invention, the anode terminal 11 and the cathode terminal 12 are respectively connected to the anode lead 10a and the cathode layer of the capacitor element 10 in such a manner that these terminals 11 and 12 are respectively connected at the upper positions of the capacitor element 10 with respect to a printed circuit board on which the capacitor body will be fixed. As a result, both the anode and cathode terminals 11 and 12 can be drawn from the capacitor body 15 at relatively high positions with respect to the base or lower surface of the capacitor body 15, which lower surface is the side facing the printed circuit board. Therefore, the exposed area of each of the terminals 11 and 12 is considerably greater than that of conventional chip capacitors of FIGS. 1A and 1B and FIGS. 2A and 2B. With the arrangement, the solid electrolytic chip capacitor according to the present invention can be soldered to a printed circuit board by means of dip soldering technique as shown in FIG. 17. In FIG. 17, the same elements as in FIG. 16 are designated at like numerals. Since the exposed area of each of the anode and cathode terminals 11 and 12 is relatively large, the molten solder 19 in the soldering bath will satisfactorily come into contact with the terminals 11 and 12 so that the terminals 11 and 12 will be securely soldered to the conductors 17a of the printed circuit board 17. Furthermore, the chip capacitors according to the invention can be manufactured by using the lead frame as described with reference to FIG. 6, and therefore mass production may be effectively performed. Moreover, since the U-shaped connecting portion 12c is used, the position of the capacitor element 10 with respect to the anode and cathode terminals 11 and 12 can be readily decided, the anode lead 10 can always be welded to a given portion in the connecting portion 11c of the anode terminal 11, preventing positional variations, and ensuring secure connection between the anode lead 10a and the anode terminal 11. The present invention, therefore, can provide solid electrolytic chip capacitors of stable quality with a low cost.

The above-described embodiments are just examples of the present invention, and therefore, it will be apparent for those skilled in the art that many modifications and variations may be made without departing from the spirit of the present invention.

What is claimed is:
1. A solid electrolytic chip capacitor comprising:
   (a) a capacitor element having an anode member with a dielectric oxide film on the surface thereof, an electrolytic layer and a cathode layer both stacked on said anode member one after the other, and an anode lead connected to said anode member and projecting outwardly from the body of said capacitor element;
   (b) a casting made of an insulating synthetic resin for supporting and surrounding said capacitor element, said casting having first and second sides which face each other, and upper and lower surfaces;
   (c) an anode terminal having a flat portion electrically connected to said anode lead at the upper portion of said anode lead, said anode terminal being drawn from said casting via said first side, and bent so that said anode terminal other than said flat portion is situated along said first side and said lower surface of said casting; and
   (d) a cathode terminal having a U-shaped portion at its one end for receiving said capacitor element therein so that said cathode layer is electrically connected to said cathode terminal, and a flat portion connected to said U-shaped portion via a crank-shaped neck portion so that said U-shaped portion, said neck portion and said flat portion constitute a crank-shaped portion, said cathode terminal being drawn from said casting via said second side, and bent so that said cathode terminal other than said crank-shaped portion is situated along said second side and said lower surface of said casting; p1 said flat portion of said cathode terminal being flush with said flat portion of said anode terminal, a plane including said flat portions of said cathode and anode terminals is positioned above a center line bisecting the height of the capacitor body, said flat portions being embedded in sid casting such that one end of each of said flat portions is a portion where said cathode or anode terminal is drawn from said casting.

2. A solid electrolytic chip capacitor as claimed in claim 1, wherein each of said anode terminal and said cathode terminal has an elongate slot at exposed portions thereof extending in a longitudinal direction so that the chip capacitor is a four-terminal structure.

3. A solid electrolytic chip capacitor as claimed in claim 1, wherein said anode terminal has a window in the vicinity of a connecting portion, for facilitating the connection of said anode terminal to said anode lead.

4. A solid electrolytic chip capacitor as claimed in claim 1, wherein the inner surface of said U-shaped portion is reflow soldered to a confronting contacted outer surface of the cathode layer of said capacitor element.

* * * * *